United States Patent [19]
Inoue et al.

[11] Patent Number: 5,844,542
[45] Date of Patent: Dec. 1, 1998

[54] IMAGE PROCESSING APPARATUS AND METHOD WITH MULTI-DIMENSIONAL DISPLAY OF IMAGE ADJUSTMENT LEVELS

[75] Inventors: Takahide Inoue; Tomoyasu Matsuzaki; Yoshiharu Hibi; Noriyuki Kurabayashi; Shinji Kita, all of Ebina, Japan

[73] Assignee: Fuji Xerox Co., Ltd., Tokyo, Japan

[21] Appl. No.: 679,397

[22] Filed: Jul. 9, 1996

[51] Int. Cl.[6] .................................................... G09G 5/02
[52] U.S. Cl. ........................................... 345/150; 358/518
[58] Field of Search .................................. 358/527, 518, 358/500, 501, 507, 537; 345/150, 152, 153, 147, 339, 431

[56] References Cited

U.S. PATENT DOCUMENTS 5,270,806  12/1993  Vonable et al. ........................... 345/150

FOREIGN PATENT DOCUMENTS

WO 92/20184  11/1992  WIPO .

*Primary Examiner*—Dennis-Doom Chow
*Attorney, Agent, or Firm*—Oliff & Berridge, PLC

[57] ABSTRACT

A state transition display window displays a hue circle and a number of setting points corresponding to respective color adjustment levels. As the user makes color adjustments, a history of the color adjustments is displayed in the form of arrows connecting related setting points. If the user specifies two setting points, images corresponding to setting point located on the line connecting the two specified setting points are displayed on an image display subwindow. A current image and six images adjacent thereto are displayed in a 6 near images display window.

6 Claims, 15 Drawing Sheets

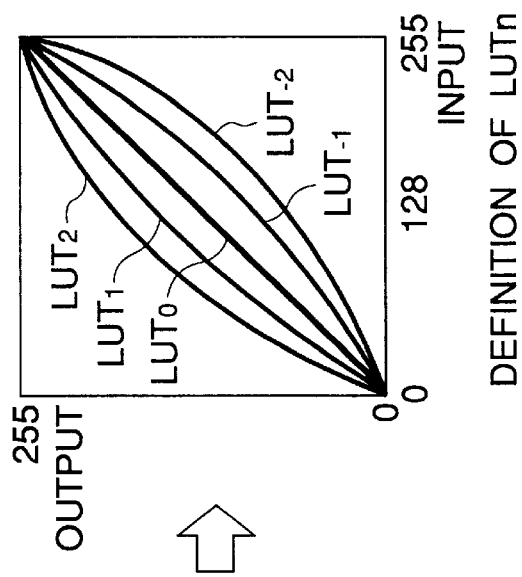
FIG.6(c)
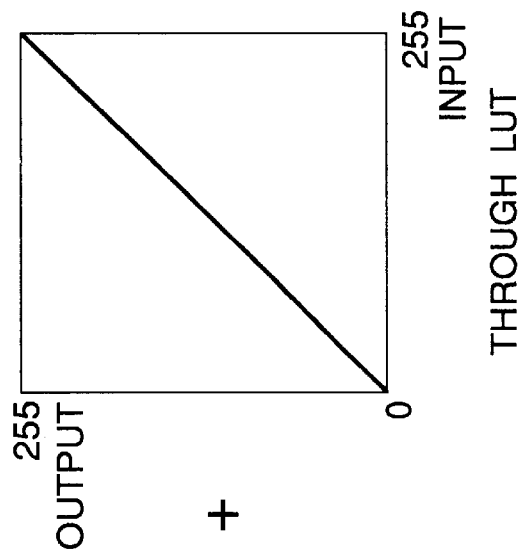
FIG.6(b)
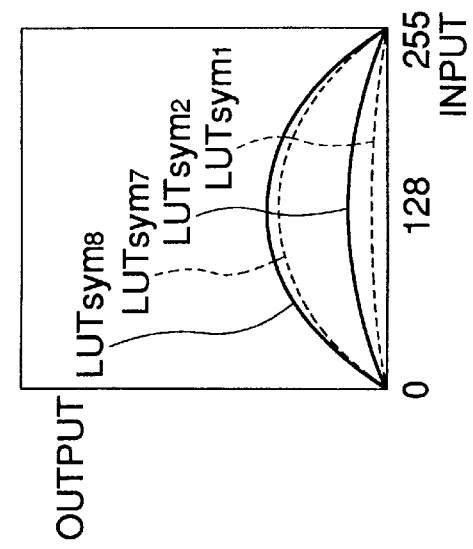
FIG.6(a)
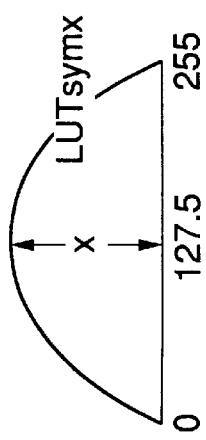

IMAGE PROCESSING APPARATUS AND METHOD WITH MULTI-DIMENSIONAL DISPLAY OF IMAGE ADJUSTMENT LEVELS

BACKGROUND OF THE INVENTION

1. Field of the Invention

This invention relates to an image processing apparatus and method suitably used for color matching in color printers, displays, etc.

2. Description of the Related Art

Nowadays, networking of information processing devices is advancing and a variety of image input/output devices and image processing apparatuses are connected to networks for data exchange. However, since the color and color reproduction range vary from one device to another, it is necessary to use, for instance, a program called "image edit application" to perform a color adjustment on image data.

FIG. 14 shows a picture used in an example of such an application. In the figure, numeral 1001 is a color adjustment section and a "current image" is displayed at the center thereof. Peripheral images provided by executing color adjustments on an original image in Y, M, C, B, G, and R directions are displayed at six positions around the current image. When the user selects a desired one of the peripheral images by mouse clicking, the selected peripheral image becomes a new current image and new peripheral images are displayed around the new current image.

As the user clicks peripheral images corresponding to a desired direction in sequence, color-adjusted images are selected. Numeral 1002 denotes a lightness adjustment section. When the user selects a part indicated as "brighter" or "darker," the lightness is changed. Numeral 1003 denotes an adjustment range setting section where the user selects a range color adjustment. As shown in FIG. 13, some color copiers are provided with an operation panel for a chroma adjustment.

However, in the technique of FIG. 14, as selection of a peripheral image is repeated, it becomes difficult to recognize what color adjustment has been executed on the original image finally. Further, since only one peripheral image is displayed in one direction for the current image, the user is required to perform complex operations. For example, to execute a color adjustment on the current image in the red direction, the operator needs to obtain a final color adjustment result by trial and error in such a manner that he selects several peripheral images in the red direction and, an excessive color adjustment is done, he selects a peripheral image in the opposite direction, namely, in the cyan direction.

In the technique of FIG. 13, the use is required to output a chroma-adjusted result on a sheet and, if not satisfied with the result, again perform a chroma adjustment. This is also a trial-and-error adjustment, and hence is not efficient.

SUMMARY OF THE INVENTION

It is therefore an object of the invention to provide an image processing apparatus and method capable of performing a color adjustment efficiently.

To attain the above object, according to a first aspect of the invention, there is provide an image processing apparatus comprising means for allowing Input of Image data that requires image processing; means for allowing designation of a level of an image adjustment to be performed on the input image data; and means for displaying image adjustment levels multi-dimensionally on a display in accordance with the designated image adjustment level. This configuration enables an efficient color adjustment.

According to a second aspect of the invention, an image processing apparatus comprising means for allowing input of image data that requires image processing; means for displaying levels of image adjustments to be performed on the input image data multi-dimensionally on a display; means for allowing an image adjustment level to be designated according to the multi-dimensionally displayed image adjustment levels; and means for performing an image adjustment on the input image data based on the designated image adjustment level. This configuration also enables an efficient color adjustment.

The image processing apparatus of the first or second aspect may further comprise means for displaying a reference image (thinned image) of adjusted image data obtained by performing the image adjustment of the designated level on the input image data. This configuration enables a more efficient color adjustment.

The image processing apparatus of first or second aspect may further comprise means for displaying, on the display, a scale of the multi-dimensionally displayed image adjustment levels. This configuration allows the user to easily recognize the scale, to thereby perform a color adjustment more efficiently.

In the image processing apparatus of the first or second aspect, the image adjustment levels may be displayed multi-dimensionally according to a color space, more specifically, in the form of a two-dimensional cross-section on a color space, or a hue circle. These configurations allow the user to recognize an image adjustment content intuitively, to thereby perform a color adjustment more efficiently.

The image processing apparatus of the first aspect may further comprise means for storing image adjustment levels that are sequentially designated, and for displaying a history of the sequentially designated image adjustment levels on the display. This configuration allows the user to easily recognize the history of image adjustments and their specific adjustment levels, to thereby perform a color adjustment more efficiently.

According to a third aspect of the invention, there is provided an image processing apparatus comprising means for displaying levels of image adjustments to be performed on original image data that requires image processing multi-dimensionally on a display; means for allowing designation of two of the multi-dimensionally displayed image adjustment levels; and means for displaying, on the display, reference images of adjusted image data obtained by performing, on the original image data, image adjustments of a given number of stepped image adjustment levels existing in a direction defined by the two designated image adjustment levels. This configuration allows the user to observe and compare a number of reference images, to thereby perform a color adjustment more efficiently.

According to a fourth aspect of the invention, there is provided an image processing apparatus comprising means for displaying a first reference image of first adjusted image data obtained by performing a first image adjustment on original image data that requires image processing; means for displaying a second reference image of second adjusted image data obtained by performing a second image adjustment on the original image data based on an image adjustment level deviated from that of the first image adjustment by a given level difference; and means for displaying reference images of adjusted image data obtained by performing, on the original image data, image adjustments of a given number of stepped image adjustment levels existing in a direction defined by the levels of the first and second image adjustments. This configuration allows the user to observe and compare a number of reference images, to thereby perform a color adjustment more efficiently.

In the image processing apparatus of the third or fourth aspect, the reference images may be displayed such that a particular reference image is varied in time series. With this configuration, since the number of simultaneously displayed images is decreased, the processing load on the image processing apparatus is reduced. This allows even an apparatus of low in processing ability to perform a color adjustment efficiently.

According to a fifth aspect of the invention, there is provided an image processing apparatus comprising means for allowing input of image data that requires image processing; means for sequentially storing levels of image adjustments to be performed on the input image data; and means for displaying reference images that represent the respective stored image adjustment levels. This configuration allows the user to easily recognize contents of past image adjustments, to thereby perform a color adjustment more efficiently.

The image processing apparatus of the fifth aspect may further comprise means for allowing designation of a particular one of the displayed reference images; means for reading an image adjustment level corresponding to the designated reference image from the image adjustment level storing means; and means for performing an image adjustment on the input image data based on the readout image adjustment level. This configuration enables quick reproduction of previously obtained image adjustment levels, thereby enabling a more efficient color adjustment.

The image processing apparatus of the third or fourth aspect may further comprise means for storing a color reproduction range of an output device; means for comparing the color reproduction range of the output device with a gamut of each of the reference images; and means for changing a display form of a reference image for which the comparing means has judged that the gamut is out of the color reproduction range. With this configuration, by looking at a reference image, the user can quickly recognize whether the gamut is out of the color reproduction range, to thereby perform a color adjustment more efficiently.

The image processing apparatus according to the first or second aspect may further comprise means for storing a color reproduction range of an output device; and means for judging whether if an image adjustment were performed based on each of the image adjustment levels, a gamut of an adjusted image would go out of the color reproduction range of the output device, wherein the adjustment levels displaying means sets display forms of the respective image adjustment levels in accordance with judgment results of the judging means. With this configuration, by looking at a displayed image adjustment level, the user can quickly recognize whether the gamut is out of the color reproduction range, to thereby perform a color adjustment more efficiently.

BRIEF DESCRIPTION OF THE DRAWING

FIGS. 5–7C illustrate how a color adjustment is performed in the first embodiment of the invention;

DESCRIPTION OF THE PREFERRED EMBODIMENTS

A. First embodiment

A-1. Hardware configuration of embodiment

Figure 1:
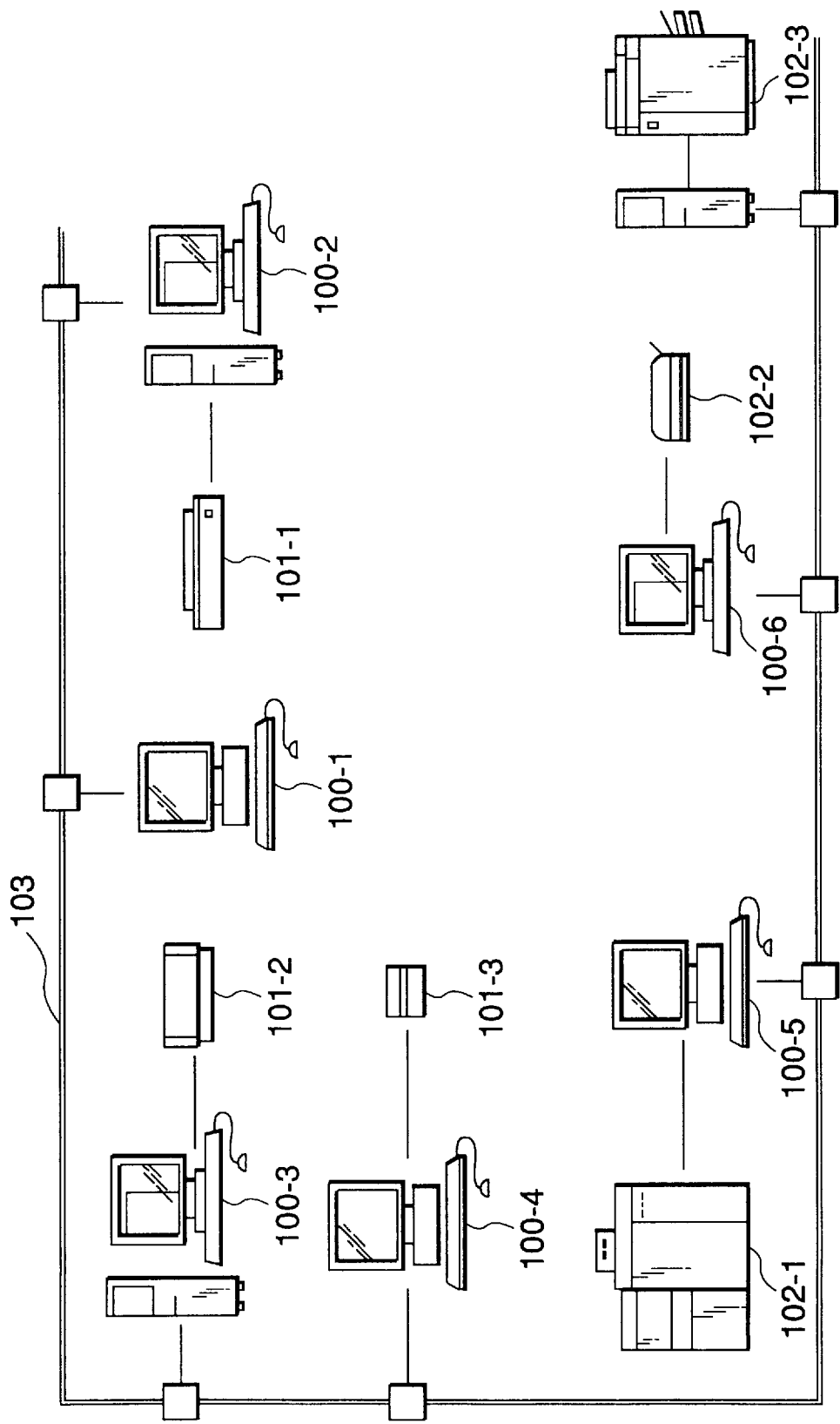
FIG. 1 is a block diagram of the entire hardware in a first embodiment of the invention.

The hardware configuration of a first embodiment of the invention will be discussed with reference to FIG. 1. In the figure, numerals 101-1 to 101-3 denote color image input devices for inputting handwritten illustrations, etc. Numerals 100-1 to 100-6 denote workstations having respective functions which perform input/output processing, color adjustment processing, etc. on image data. Numerals 102-1 to 102-3 denote color image output devices such as a color printer and a color copier.

Numeral 103 denotes a local area network line for connecting the workstations 100-1 to 100-6 to each other, whereby the workstations having respective functions 100-1 to 100-6 can exchange color image data and input/output image data through any of the color image input devices 101-1 to 101-3 and the color image output devices 102-1 to 102-3.

Figure 2:
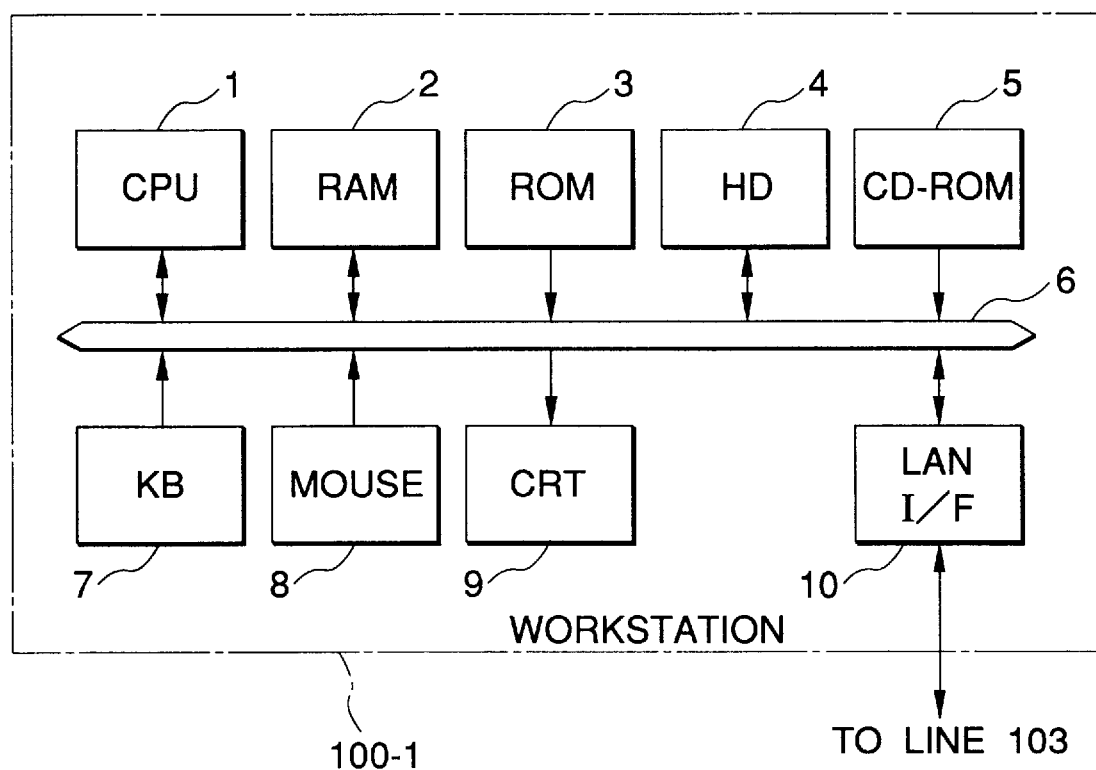
FIG. 2 is a detailed block diagram of a workstation 100-1 in the first embodiment of the invention.

Next, the configuration of the workstation 100-1 will be discussed with reference to FIG. 2. In the figure, a CPU 1 controls the other components based on a control program (described later). A RAM 2 stores various programs, data, etc. A ROM 3 stores an initial program loader etc. A hard disk drive 4 stores an operating system, various applications, image data, etc., and is also used as a virtual storage of the RAM 2. A CD-ROM drive 5 reads image data etc. from a CD-ROM.

A keyboard 7 and a mouse 8 are manipulated by the user. A display 9 displays various images for the user. A LAN interface 10, which is connected to the local area network line 103, communicates with the other workstations 100-2 to 100-6.

A-2. Software configuration (1) General configuration of software

Figure 3:
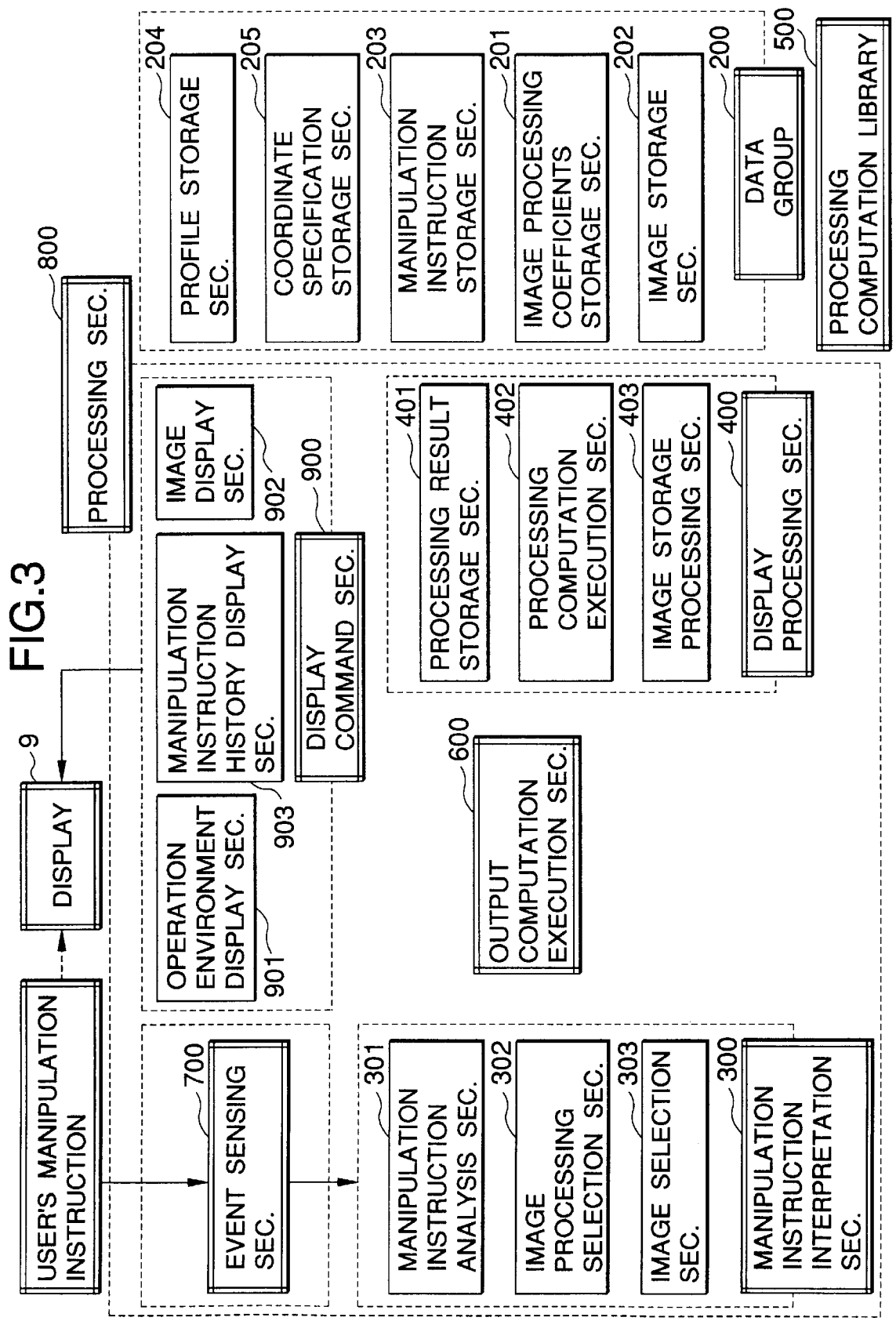
FIG. 3 is a block diagram showing the software configuration of the workstation 100-1 in the first embodiment of the invention.

Next, the software configuration of the embodiment will be discussed with reference to FIG. 3. First, the software of the embodiment is roughly classified into a processing section 800 (including hardware such as the CPU 1), a processing computation library 500 that is called by the processing section 800 when necessary, and a data group

200 to be processed by the processing section 800. The processing section 800 consists of an event sensing section 700, a manipulation instruction interpretation section 300, a display command section 900, an output computation execution section 600, and a display processing section 400.

(Data group 200)

In the data group 200, an image storage section 202 stores image data to be processed. Image data are represented by various kinds of color signals (i.e., on various color spaces). For example, device-independent color signals include L*a*b* signals, L*c*h° signals, and XYZ signals. Device-dependent color signals include RGB signals proper to each of the color image input devices 101-1 to 101-3, and KYMC signals proper to each of the color image output devices 102-1 to 102-3.

Color signals on different color spaces can be converted mutually according to predetermined conversion equations. Conversion coefficients used in a conversion equation are called "profile." A profile storage section 204 is an area for storing such profiles. The display processing section 400 can execute a color adjustment on image data stored in the image storage section 202 (described later in detail). Image data as a color adjustment result may be stored in the image storage section 202 as it is; however, storage of only the values of the coefficients used for the color adjustment makes it unnecessary to store the processed image data. An image processing coefficient storage section 201 is an area for storing such processing coefficients.

A hue circle (or a two-dimensional cross-section in a color space) is displayed on the screen of the display 9, and the user can perform a color adjustment by specifying coordinates on this plane (described later in detail). A coordinate specification storage section 205 stores a history of specified coordinates. A manipulation instruction storage section 203 stores a history of user instruction contents other than coordinates.

(Processing section 800)

The event sensing section 700 in the processing section 800 forms part of a window shell of the operating system. That is, the event sensing section 700 monitors events of the keyboard 7 and the mouse 8, and, when an event occurs, notifies the manipulation instruction interpretation section 300 of the event occurrence. The manipulation instruction interpretation section 300 consists of a manipulation instruction analysis section 301, an image processing selection section 302, and an image selection section 303. The manipulation instruction analysis section 301 analyzes the instruction content of an event.

An analyzed instruction content is roughly classified into one for selection of a kind of image processing or one for selection of image data. In the former case, the instruction content is sent from the manipulation instruction analysis section 301 to the image processing selection section 302, which calls a processing routine in the display processing section 400, the display command section 900, or the output computation execution section 600 in accordance with the received content.

For example, when the user clicks the mouse in a state that a mouse cursor overlaps with a certain switch displayed on the display 91 the manipulation instruction analysis section 301 judges that this switch has been depressed and notifies the image processing selection section 302 of this analysis result, whereupon processing corresponding to the switch is executed. On the other hand, when the user has made an image data selection instruction, the content is sent to the image selection section 303, which selects image data to be processed from among the data group 200.

The display command section 900 consists of an operation environment display section 901 for displaying various operation environments on the display 9, a manipulation instruction history display section 903 for displaying a history of manipulations made by the user, and an image display section 902 for displaying various image data. Therefore, image data selected by the image selection section 303 is displayed on the display 9 through the image display section 902. When the operation environment is changed by the image processing selection section 302, a result is displayed through the operation environment display section 901. The manipulation instruction history display section 903 displays histories stored in the manipulation command storage section 203 and the coordinate specification storage section 205.

In the display processing section 400, an image storage processing section 403 reads image data to be processed from the image storage section 202 and writes processed image data into the image storage section 202. A processing computation execution section 402 performs color adjustment processing based on a processing content specified by the image processing selection section 302. The content of that conversion can be expressed as a lookup table that defines a relationship between image data before and after the color adjustment.

(2) Details of processing (a) Color conversion processing

Figure 4:
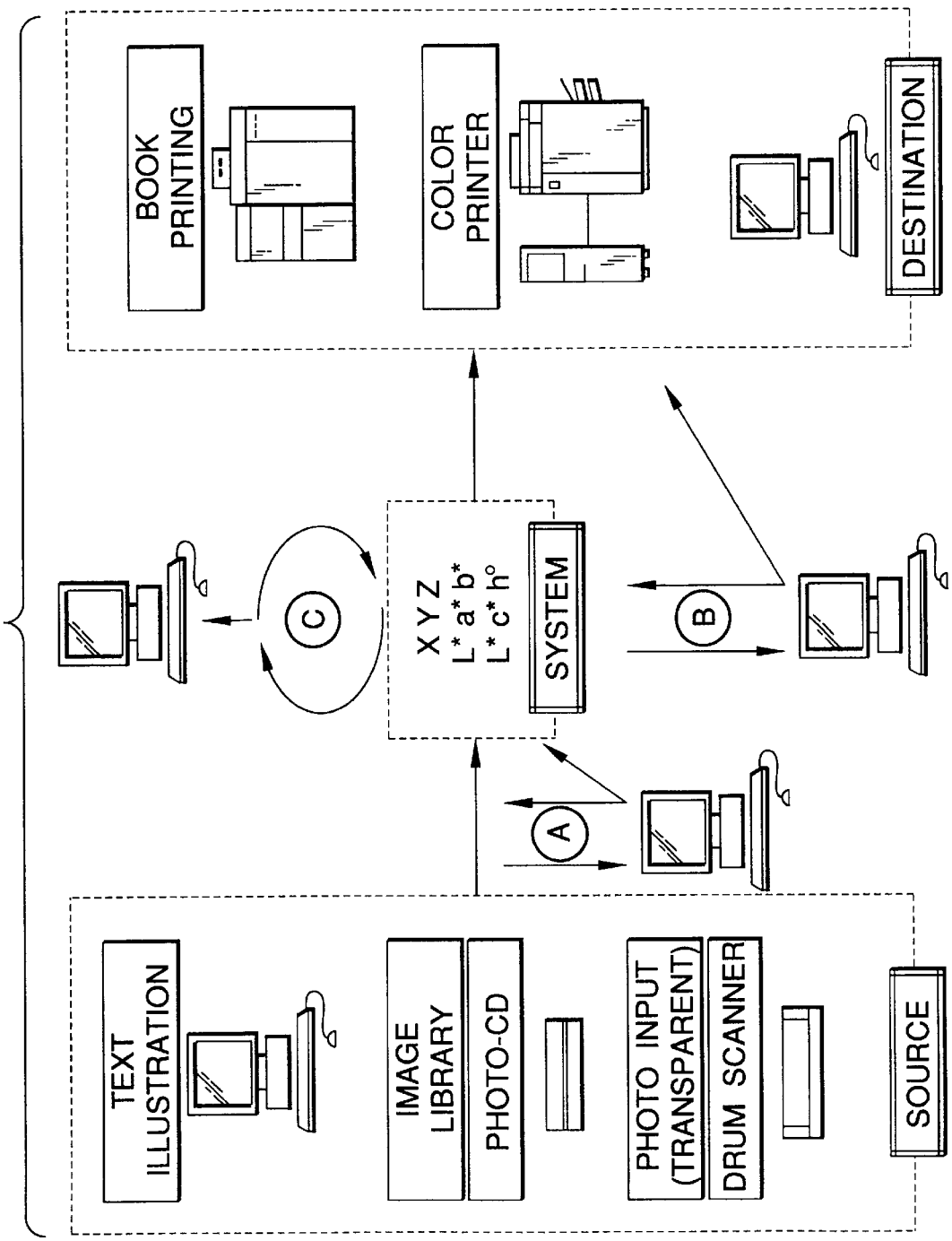
FIG. 4 show the outline of color conversion processing in the first embodiment of the invention.

Color conversion processing executed in the display processing section 400 will be outlined with reference to FIG. 4.

In the embodiment, image data can be input through the color image input devices 101-1 to 101-3. In addition, characters, illustrations, image libraries, etc. input through the CD-ROM drive 5 are also image data that ire input to the system of the embodiment. Such image data are mainly RGB signals and device dependent. Hereinafter, the input image data formats (mainly, RGB signals) will be collectively called "source format."

In the embodiment, the color image output devices 102-1 to 102-3 are provided as devices capable of outputting image data, wherein device-dependent KTMC signals are mainly used. The display 9 also outputs (displays) an image in the form of RGB signals, which are also device dependent. The output image data formats will be collectively called "destination format."

Within the system, device-independent formats (L*a*b* signals, L*c*h° signals,, XYZ signals) are used to secure compatibility of image data. These formats will be collectively called "system format." To execute a color adjustment on image data in one of such various formats, color conversion needs to be performed as a prerequisite. For this purpose, the following [A], [B], and [a] schemes are conceivable.

<[A] scheme>

In the [A] scheme, a color adjustment is performed on image data in the source format in the display RGS color space and conversion from the source format into the system format is performed based on resulting color adjustment coefficients. Thus, first RGB signals in the source format (hereinafter referred to as source KGB signals) must be converted into RGB signals to be displayed on the display 9 (hereinafter referred to as display RGB signals). Such conversion between two sets of RGB signals can be easily executed with a table, or the like.

However, conversion from image data in the source format into image data in the system format based on an adjustment result of a color adjustment executed on display RGB signals is complex. That is, the [A] scheme requires four stages of conversion consisting of the first conversion from source RGB signals to display RGB signals, the second conversion from the display RGB signals to display R'G'B' signals (final color adjustment result), the third conversion from the display R'G'B' signals to source RGB signals, and the fourth conversion from the source RGE signals to the system format.

If conversion from the display R'G'B' signals to the system format is possible, the [A] scheme requires three stages of conversion consisting of the first conversion from the source RGB signals to the display RGB signals, the second conversion from the display RGB signals to the display R'G'I' signals (final color adjustment result), and the third conversion from the display R'G'B' signals into the system format. In practice, conversion coefficients of the three or four stages are combined into a single set of conversion coefficients, and image data in the source format is converted into image data in the system format by using the combined conversion coefficients. However, since a large number of conversion coefficients need to be combined, there is a possibility that the precision of the conversion coefficients is lowered.

<[B] scheme>

In the [B] scheme, a color adjustment is performed on image data in the system format in the display RGB color space and conversion from the system format to the destination format is performed based on resulting color adjustment coefficients. Thus, first signals in the system format, such as L*a*b* or XY2, must be converted into RGB signals. Also in this case, as in the case of the [A] scheme, there is a possibility that the precision of the coefficients of conversion from the system format to the destination format is lowered.

<[C] scheme>

In the [C] scheme, a color adjustment is performed in the system format color space, such as L*a*b* or XYZ, and an adjustment result is converted into display RGS signals only for its display on the display 9. If the system is used for conversion from the system format to the destination format, there are required only two stages of conversion consisting of the first conversion from system format signals (L*c*h°) to L*'c*'h°' signals (adjusted signals) and the second conversion from the L*'c*'h°' signals to the destination format. This provides an advantage that a color adjustment on an image and display on the display 9 become independent processes.

Thus, in the case of the color adjustment processing of the [C] scheme, the number of times of color conversion to obtain a profile is small, so that influences of errors can be suppressed. If the [C] scheme is adopted, it is no longer necessary to use the [A] or [B] scheme. Further, in the [C] scheme, color adjustment coefficients describe conversion from the system format to the system format, so that the profile form can be unified. Preferably, L*c*h° signals are used as system format signals in the [C] scheme.

However, the [C] scheme has the following disadvantage. To display a large number of color adjustment results on the display 9 for comparison and examination, conversion between different color spaces like conversion from the system format to display RGB signals is frequently performed, resulting in a longer processing time. That is, since a color adjustment result obtained according to the [C] scheme is in the system format, color conversion needs to be executed each time a color adjustment result is displayed on the display 9.

In contrast, in the [A] and [B] schemes, since a color adjustment is executed on display RGB signals, it suffices that each of the conversion from the source or system format to display RGB signals and the conversion from display RGB signals to the source or system format be performed only once. In other words, it suffices that color conversion to be performed once at the beginning and the end. Since each of the [A]+[B] scheme and the [C] scheme has both advantages and disadvantages, the embodiment is so constructed as to enable the user to specify a desired one of those schemes.

(b) Color adjustment processing when [A]+[B] scheme is adopted

Figure 5:
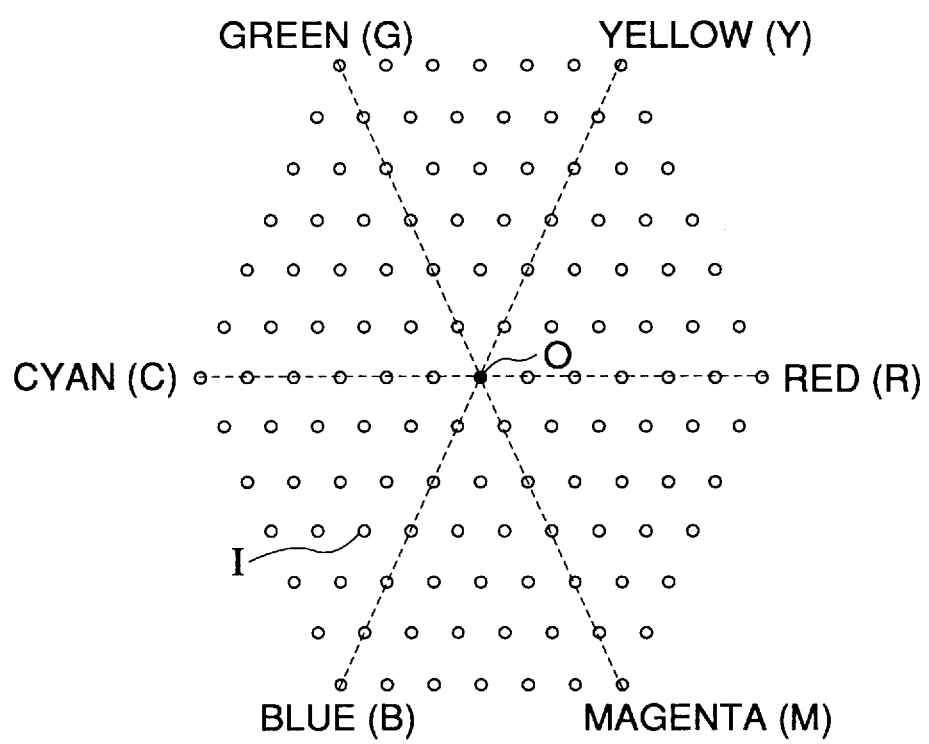

With reference to FIG. 5, color adjustment processing executed in the display processing section 400 when the [A]+[B] scheme is adopted will be outlined.

In the embodiment, a hue circle with an original image located at the center O is assumed, as shown in FIG. 5. Green (G), red (R), and blue (B) directions extending from the center O are so defined as to divide the hue circle into three equal parts.

In the figure, directions corresponding to cyan (C), magenta (M), and yellow (Y) are also shown; since these colors are complementary colors to red (R), green (G), and blue (B), they can be represented as negative values in the red (R), green (G), and blue (B) directions, respectively. That is, "strengthen one step in the red (R) direction" is synonymous with "weakening one step in the cyan (C) direction."

Next, points (setting points) arranged in the red (R), green (G), and blue (B) directions at predetermined intervals in the hue circle are assumed, and a color adjustment content is defined by using the coordinates of a setting point. For example, as a specified setting point is more distant from the center O in the yellow (Y) direction, a color adjustment is made so as to strengthen yellow (T). A setting point I shown in FIG. 5 means a color adjustment on the original image to strengthen blue (B) by four steps and strength green (G) by one step. Therefore, the setting point I has coordinates (B, G)=(4, 1)

with the blue (B) and green (G) directions used as axes.

The setting point I can also be regarded as meaning a color adjustment on the original image to weaken green (G) by three steps (strengthen magenta (M) by three steps) and weaken red (R) by four steps (strengthen cyan (C) by four steps). Likewise, it can be regarded as meaning a color adjustment on the original image to weaken red (R) by one step and strengthen blue (B) by three steps. Therefore, the setting point I can also be represented by the following coordinates:

(G, R)=(-3, -4), or (R, B)=(-1, 3)

In this manner, the coordinates of any setting point on the hue circle can be represented by using any two of R, G, and B as axes.

Next, with reference to FIG. 6, a specific calculation method for adjusting the colors of R. G, and B will be discussed. Here, assume that each color of R, G, and B is represented by 256 gradation levels. As shown in FIG. 6(*a*), a lookup table LUTsym$_x$ having a maximum value at the center "127.5" of an input signal and is symmetrical with respect to the center is assumed, where x is a maximum output value. A lookup table LUTsym$_1$ is defined first and lookup tables LUTsym$_x$ (x is 2 or more) are so defined as to satisfy (table value of LUTsym$_x$)=x·(table value of LUTsym$_1$).

Next, as shown in FIG. 6(*b*), a lookup table (through LUT) is assumed in which input and output signals have the same value. By adding or subtracting each lookup table LUTsym$_x$ to or from the through LUT, lookup tables LUT$_n$ (n=. . . , −2, −1, 0, 1, 2, . . . ) as shown in FIG. 6(c) are obtained, where the subscript n is equal to x in the case of addition and is a negative value of x in the case of subtraction. The through LUT is expressed as a lookup table $LUT_n$ where n is equal to 0.

The term "step," which was used above in connection with FIG. 5, is defined here. "To strengthen by m steps" in one of directions R, G, and B is defined as "to employ a lookup table whose subscript n is greater by k·m for the color in the strengthening direction (where k is a variable indicating the unit width of change) and lookup tables whose script n is smaller by k·m/2 for the colors in the other directions."

For example, when the unit width of change, k, is 2, "to strengthen the original image one step in the blue (B) direction" means to apply, to the respective colors, lookup tables $LUT_n$ where the subscript n in the blue (B) direction is 2 and the subscripts n in the red (R) and green (G) directions are −1. If the subscript n is not an integer, the integral subscripts preceding and following the subscript n may be found and linear interpolation may be applied to table values of the lookup tables having the subscripts thus found.

An array of three elements is obtained by arranging the subscripts n of the lookup tables LUT, applied to the colors R, G, and B. This array is expressed as SUF(B, G, R). For examples the original image corresponds to an array SUF(B, G, R)=(0, 0, 0). Strengthening the original image by one step in the blue (B) direction corresponds to an array SUP(B, G, R) (2, −1, −1) Likewise, strengthening the original image by one step in the other directions corresponds to arrays SUF (B, G, R) listed in Table 1.

TABLE 1

| Direction of change | SUF(B, G, R) (k = 2) |
| --- | --- |
| Blue (B) | (2, −1, −1) |
| Yellow (Y) | (−2, 1, 1) |
| Green (G) | (−1, 2, −1) |
| Magenta (M) | (1, −2, 1) |
| Red (R) | (−1, −1, 2) |
| Cyan (C) | (1, 1, −2) |

The setting point I shown in FIG. 5 can be represented by coordinates (B, G)=(4, 1) by using the blue (B) and green (G) directions as axes, as described above. A corresponding array SUF (B, G, R) is calculated as $$SUF(B, G, R) = (2, -1, -1) \times 4 + (-1, 2 - 1) \times 1$$
$$= (7, -2, -5).$$

The same result is obtained even if coordinate values on the other sets of axes, namely, (G, R)=(−3, −4) and (R, B)=(−1, 3) are used. A color adjustment is performed by using the lookup table of R, G, and B corresponding to the thus-obtained array SUF(B, G, R).

(c) Color adjustment processing when [C] scheme is adopted

Figure 7A:
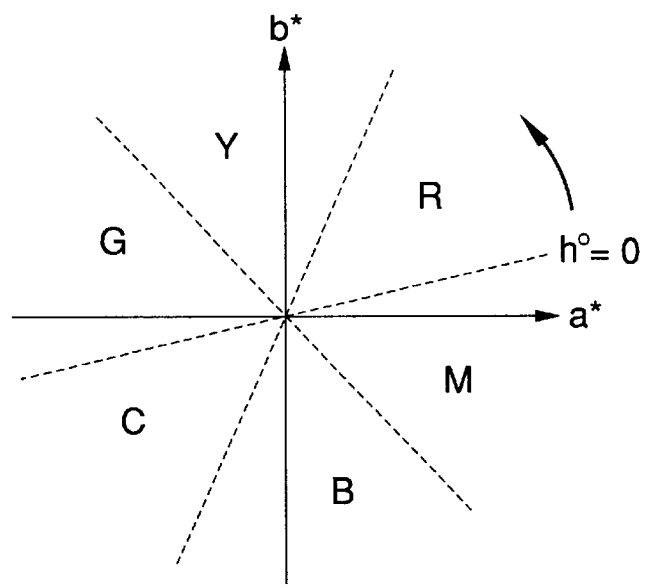
Figure 7B:
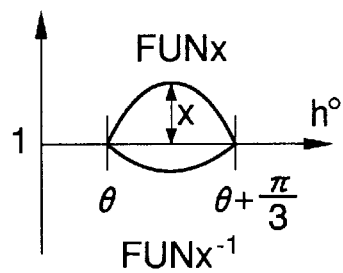
Figure 7C:
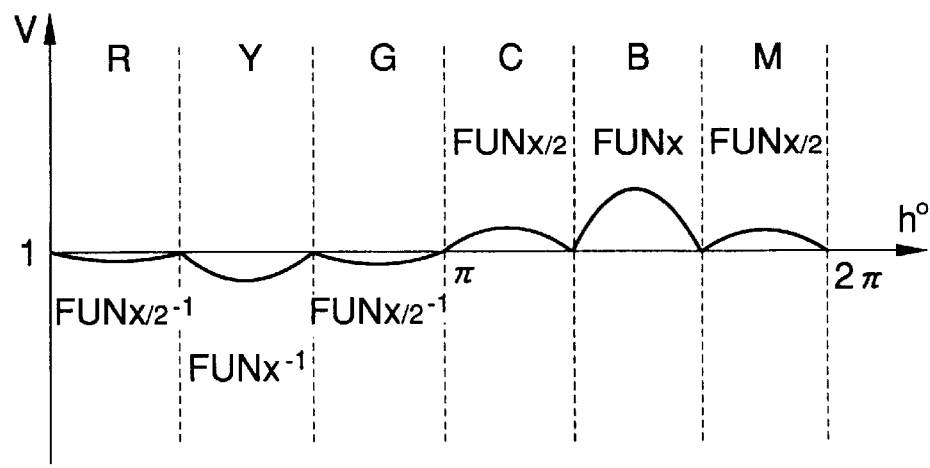

With reference to FIGS. 7A–7C, color adjustment processing executed in the display processing section 400 when the [C] scheme is adopted will be outlined below. Where the [C] scheme is adopted, color adjustment processing is performed in a device-independent color space. Here, assume that the L*a*b* space is employed. The coordinates in the L*a*b* space are represented by L*c*h° signals (polar coordinates).

First, the a*b* cross-section of the L*a*b* space is divided into six equal parts to determine Y, M, C, B, G, and R areas, as shown in FIG. 7A. Assume that the signal h of the L*c*h° signals is 0 at the boundary between the red (R) and magenta (M) areas, as shown in FIG. 7A. Next, functions $FUN_x$ and $FUN_x^{-1}$ are defined as shown in FIG. 7B. That is, the function $FUN_x$ increases monotonously from 1 to x in the signal h range of θ to θ+π/6, and then decreases monotonously from x to 1. That is, the waveform is symmetrical with respect to the vertical line of h=θ+π/6.

On the other hand, the function $FUN_x^{-1}$ is defined as a function that satisfies $FUN_x \times FUN_x^{-1} = 1$. A function $FUN_1$ is defined first, and functions $FUN_x$ (x is 2 or more) are so defined as to satisfy (value of $FUN_x$)=x·(table value of $FUN_1$).

By the way, as described previously with reference to FIG. 5, a content of color adjustment processing in the embodiment is represented as "to strengthen blue (B) by three steps and green (G) by one step," for example. Where the [C] scheme is adopted for color conversion, "to strengthen a color in a specific direction by x steps" is defined as "to apply a function $FUN_x$ to the original image in the area associated with the specific direction in the L*a*b* space, apply a function $FUN_{x/2}$ to the original image in the areas contiguous to that area, apply a function $FUN_x^{-1}$ to the original image in the area associated with a direction that is complementary to the specific direction, and apply a function $FUN_{x/2}^{-1}$ to the original image in the remaining areas."

For example, as shown in FIG. 7C, "to strengthen blue (B) by x steps" is equivalent to "to apply a function $FUN_x$ to the original image in the blue (B) area, apply a function $FUN_{x/2}$ to the original image in the cyan (C) and magenta (M) areas that are contiguous to the blue (B) area, apply a function $FUN_x^{-1}$ to the original image in the yellow (Y) area associated with the yellow (Y) direction that is complementary to the blue (B) direction, and apply a function $FUN_{x/2}^{-1}$ to the original image in the remaining red (R) and green (G) areas." The vertical axis in FIG. 7C (table value v) represents a value by which the c* component of the L*a*b* signals is to be multiplied.

In the example shown in the FIG. 7C, the table value v is greater than 1 in the blue (B), cyan (C), and magenta (M) areas, so that the colors belonging to these areas are enhanced. In contrast, in the yellow (Y), red (R), and green (G) areas, c* is multiplied by a value smaller than 1, so that the colors are weakened. To change strength in two directions as in the case of "strengthening blue (B) by three steps and green (G) by one step," functions as shown in FIG. 7C are determined for each of the two directions and multiplication values of the thus-determined functions are set as final table values v.

A-3. Operation of embodiment (1) Initial operation

Figure 8:
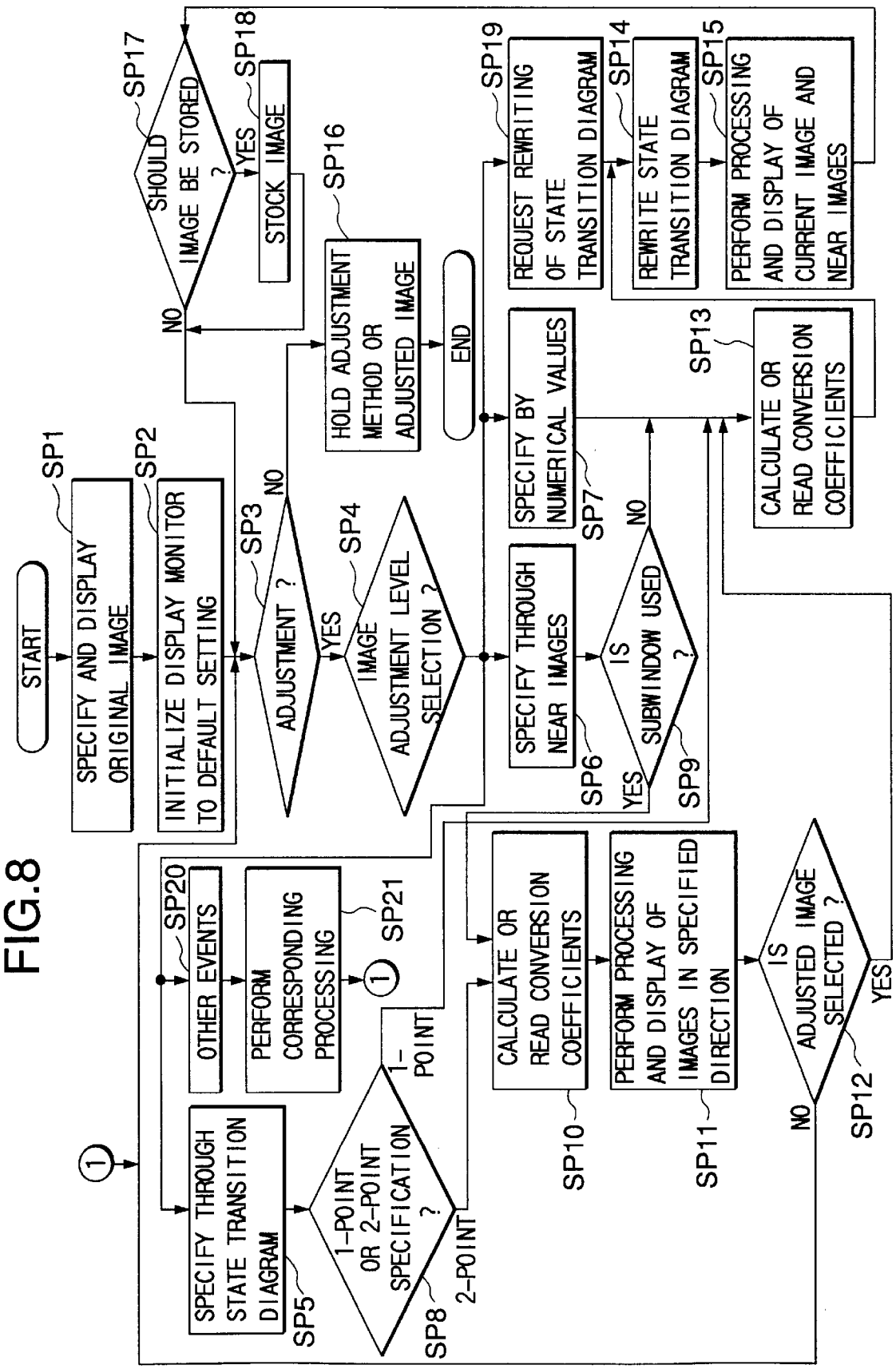
FIG. 8 is a flowchart of a control program in the first embodiment of the invention.

The operation of the embodiment will be discussed with reference to FIG. 8. In step SP1, the user specifies original image data to be processed from the image data stored in the image storage section 202. In step SP2, the display contents of the display 9 are initialized. That is, the contents as shown in FIG. 9 are displayed on the display 9.

Figure 9:
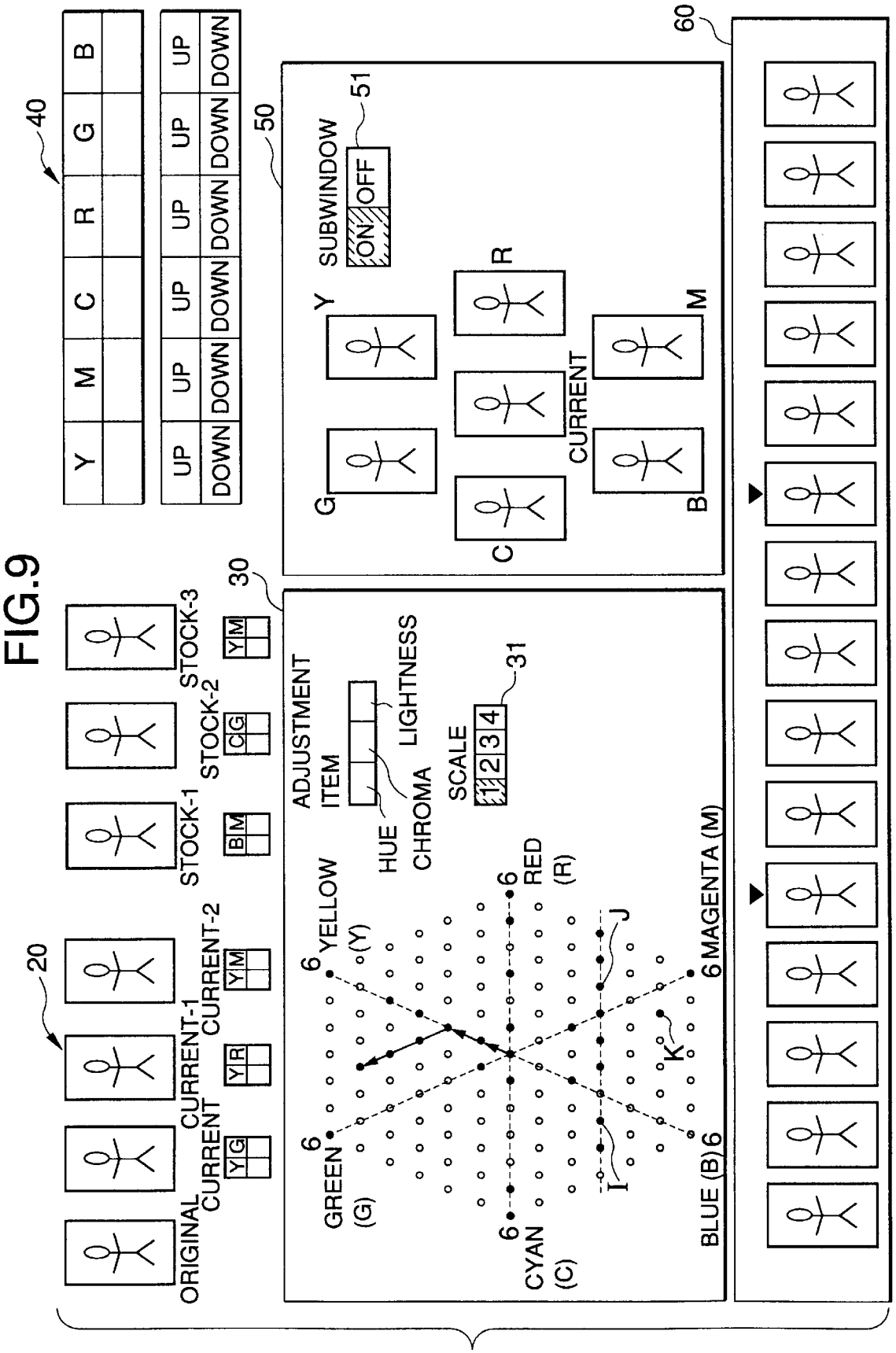
FIG. 9 illustrates display contents of a display 9 in the first embodiment of the invention.

In FIG. 9, numeral 30 denotes a state transition display window for displaying a hue circle and setting points arranged in the red (R), green (G), and blue (B) directions at predetermined intervals, which were described above with reference to FIG. 5. FIG. 9 shows a state with edited results of color adjustments. In the initial state, only the center of the hue circle is displayed in a black dot and the other setting points are displayed in white dots.

In FIG. 9, numeral 20 denotes an image holding function section where the original image is displayed at the leftmost position and the current image is displayed to the right of the original image. The current image is an image obtained by performing various color image processing on the original image. When no color adjustments have been executed, the original image and the current image are identical. The image holding function section 20 also displays "current-1" and "current-2" images to the right of the current image. These images are displayed in thinned form. These images will be described later in further detail.

Numeral 40 denotes a color adjustment strength display section for displaying a color adjustment content of the current image in terms of numerical values. Further, the user can specify numerical values in the color adjustment strength display section 40, to perform a color adjustment. Numeral 50 denotes a 6 near images display window for displaying the current image and images corresponding to six setting points adjacent to the current image (images obtained by performing a color adjustment of one step in each direction). Therefore, in the initial state, the original image and its six near images are displayed in the window 50.

Numeral 60 denotes an image display subwindow for listing images corresponding to setting points arranged in line in the state transition display window 30 (details will be described later). In the initial state, nothing is displayed in the image display subwindow 60. The apparatus may be so constructed that display of the image display subwindow 60 itself is suppressed in the initial state and is displayed upon occurrence of a predetermined manipulation. After the above items have been displayed, the process goes to step SP3, to wait for an event in the keyboard 7 or the mouse 8.

When the user has made an instruction of "no adjustment" or "quitting adjustment" (when an event to such an effect has occurred), a determination NO is made in step SP3 and the process goes to step SP16, details of which will be described later. On the other hand, when an event other than the above-mentioned event has occurred in step SP3, the process goes to step SP4, where the content of the event is interpreted. The process branches to an appropriate step in accordance with the content.

Since the subsequent processing depends on the event content, and separate descriptions will be made of the respective cases.

(2) Processing corresponding to event on setting point in state transition display window 30

(a) 1-point specification

When the user doubly clicks the mouse 6 in a state that a mouse cursor overlaps with one of the setting points in the state transition display window 30, the process goes to step SP13 via steps SP5 and SP8. In step SP13, to effect a color adjustment corresponding to the setting point where the event has occurred, the display processing section 400 calculates or reads conversion coefficients. That is, if conversion coefficients have already been determined in the past processing, those coefficients are read. If not, calculation is made.

The method of calculating conversion coefficients depends on the color conversion scheme. That is, if the [A] or [B] scheme is employed as the color conversion scheme, lookup table $LUT_n$ (see FIG. 6(c)) is determined for each of R, G, and B. On the other hand, if the [C] scheme is employed, table values v corresponding to a signal h (see FIG. 7C) are determined.

Thus, in the embodiment, a common color adjustment user interface is used independently of the type of color conversion scheme. Therefore, the user need not recognize which of the [A] to [C] schemes is adopted. Since the lookup tables $LUT_n$ and the table values v are also determined for each of the six near images, seven sets of $LUT_n$ and v are determined in total.

Next, in, step SP14, the contents of the state transition display window 30 are rewritten. That is, the doubly clicked setting point is changed to black, and an image obtained by performing a color adjustment of that setting point on the original image becomes a new current image. In the state transition display window 30, the setting points of the new current image and the "current-1" image (previous current image) are connected to each other by an arrow.

Next, when the process goes to step SP15, the display processing section 400 actually determines the current image and the six near images, and causes the windows and other parts to reflect results thereof. That is, the current image at the center is determined first and the six near images are then determined, and those images are displayed in the 6 near images display window 50.

The current image thus determined is displayed in the CURRENT field of the image holding function section 20 and the images previously displayed in CURRENT and CURRENT-1 fields are shifted to CURRENT-1 and CURRENT-2 fields, respectively. Color adjustment levels corresponding to the current, current-1, and current-2 images are displayed under the respective images. For example, if the current image is "an image obtained by strengthening yellow (Y) by two steps and strengthening green (G) by three steps," Y and G boxes are provided and digits 2 and 3 are displayed therein. This also applies to the current-1 and current-2 images.

The processing in the display processing section 400 depends on the color conversion scheme employed, needless to say. Where the [A] or [B] scheme is adopted, a color adjustment is performed on RGB signals (for the display 9) of the original image, whereby the above-mentioned current image, six near images, etc. are obtained. On the other hand, where the [C] scheme is adopted, color conversion processing is performed on the L*c*h° signals of the original image and resultant L*c*h° signals are converted into RGR signals (for the display 9), and resultant images are displayed.

Further, the numerical values displayed in the color adjustment strength display section 40 are also updated based on the color adjustment content of the current image. Then, the process goes to step SP17. In step SP17, a new window is opened on the display 9 in which window a message of "DO YOU STOCK THE CURRENT IMAGE?" and YES and NO buttons. If the user clicks the YES button with the mouse 8, the process goes to step SP18, where first the current image is stored in a predetermined area of the image storage section 202. Alternatively, the apparatus may be so designed that a stock button is displayed at a predetermined position of the display 9 and the current image may be stocked upon the user's clicking of that button.

Then, the stored image is displayed in the STOCK-1 field in the image holding function section 20. The images previously displayed in the STOCK-1 and STOCK-2 fields are shifted to STOCK-2 and STOCK-3, respectively. At the termination of the above steps, the new window is closed and the process returns to step SP3 and waits for a new input event. If the user clicks the NO button in the new window with the mouse 8, the process returns to step SP3 without execution of step SP18.

(b) 2-point specification

When the user clicks one setting point in the state transition display window 30 and then clicks another setting point, it is judged whether a condition "the line connecting these two setting points is parallel with any of the red (R)-cyan (C) axis, the green (G)-magenta (M) axis, and the blue (B)-yellow (Y) axis" is satisfied.

For example, setting points I and J in the state transition display window 30 satisfy the above condition. If the condition is satisfied, the process goes to step SP10. If the condition is not satisfied, the two mouse events become ineffective and the user needs to again specify setting points. In step SP10, conversion coefficients corresponding to all the setting points on the line are determined; conversion coefficients for each setting point are determined as described above in connection with step SP13.

Then, in step SP11, the display processing section 400 determines images corresponding to the setting points and lists those images in the image display subwindow 60. Then, in step SP12, the process waits for a next input event. In this state, the user may compare the images in the image display subwindow 60 with the images in the 6 near images display window 50 and determine the optimum image among them.

If the optimum image exists in the image display subwindow 60, the user may click that image. If no appropriate image exists in the image display subwindow 60, the user may perform a proper manipulation on some other window. When the user clicks an image in the image display subwindow 60, a determination YES is made in step SP12 and the process goes to step SP13. That is, the clicked image becomes a new current image and conversion coefficients of six near images of the new current image are calculated, read, displayed, etc.

On the other hand, if an input event occurs in any part other than the image display subwindow 60, a determination NO is made in step SP12 and the process goes to step SP3. In this case, the event content detected in step SP12 is passed to step SP3 intact. Therefore, no input event waiting is performed in step SP3, and a step suitable for the passed event content is immediately executed.

(3) Processing corresponding to event on six near images in 6 near images display window 50

If an event on the six near images in the 6 near images display window 50 is detected in step SP3, the process goes to step SP9 via step SP6. In step SP9, it is judged whether subwindow display is to be effected (whether a flag "sub_change" is "1"). If the flag sub_change is "0," a determination NO is made and the process goes to step SP13.

In such a case, similar processing to that when a setting point contiguous to the current image is selected in the state transition display window 30 (for 1-point specification) is performed. That is, the clicked image of the six near images is set as a new current image and the contents of the state transition display window 30, the 6 near images display 50, etc. are updated accordingly.

On the other hand, if the flag sub_change is "1," a determination YES is made in step SP9 and the process goes to step SP10. In step SP10, the clicked image is set as a new current image and setting points positioned on the line connecting the previous current image (current-1 image) and the new current image are determined. Conversion coefficients corresponding to those setting points are calculated or read.

Thereafter, similar processing to that of a case where two points are specified in the state transition display window 30 is performed. That is, images corresponding to the above-obtained setting points are listed in the image display subwindow 60. If the user clicks one of the images in the image display subwindow 60, the clicked image is set as a new current image. If the user effects mouse clicking at any part other than the image display subwindow 60, processing corresponding to that event is performed.

If the flag sub_change is "1," when the user clicks one of the six near images, a plurality of images that have been adjusted in the direction corresponding to that image are displayed in the image display subwindow 60. Such processing is effective particularly when the direction in which a color adjustment is to be made (for example, the red (R) direction) is known but the strength of the color adjustment is unknown. That is, in this example, images more weakly adjusted in the red (R) direction than the current image and those more strongly adjusted are listed in the image display subwindow 60, whereby the user can select the most suitable image while comparing them.

(4) Processing corresponding to event in color adjustment strength display section 40

When the user clicks the color adjustment strength display section 40, a keyboard cursor is displayed at the corresponding point, enabling the user to enter a color adjustment content in the form of numerical information through the keyboard 7. The user can also use the mouse 8 to enter numerical information: as the user clicks one of "UP/DOWN" buttons located under the color adjustment strength display section 40, the corresponding numerical value is incremented or decremented. When necessary numerical information has been entered, the process goes to step SP13 and the subsequent processing in performed in the same manner as described above.

(5) Processing corresponding to event in scale setting section 31

A scale setting section 31 is provided in the state transition display window 30. If a mouse event is detected at a position indicated as "1," "2," "3," or "4" in the scale setting section 31 in step SP3, the process goes to step SP19, where the clicked value is set as the unit change width k. The process then goes to step SP14, where the scale of the state transition display window 30 is changed in accordance with the newly set unit change width k and the state transition display window 30 is re-displayed, i.e., updated, in accordance with the new scale.

When the state transition display window 30 is re-displayed, the currently selected unit change width k ("1," "2," "3," or "4") is reverse-displayed in the scale setting section 31, whereby the user can recognize the unit change width k employed in the state transition display window 30 by looking at the scale setting section 31.

(6) Processing corresponding to other events

When an event other than mentioned above is detected in step SP4, steps SP20 and SP21 are executed. After processing corresponding to the detected event is performed, the process returns to step SP3. For example, when an event occurs at a SUBWINDOW ON/OFF switch 51 in the 6 near images display window 50, the flag sub_change is set at "1" or "0" accordingly.

Thus, the user can switch the function of the 6 near image display window 50. That is, if the flag sub_change is "1," the user can compare images adjusted weakly in a desired direction and those adjusted strongly, as described above. On the other hand, if the flag sub_change is "0," the user can change only the current image and the six near images with the display contents of the image display subwindow 60 fixed. This is useful, for instance, when the user wants to temporarily observe images adjacent to the images displayed in the image display subwindow 60.

When the user clicks the CURRENT-1 or CURRENT-2 image or one of Stock-1 to Stock-3 images, the clicked image is set as a new current image. Therefore, if the user could not obtain a preferable result after several attempts that produced respective current images, he can restore a previous current image promptly.

(7) Processing performed when instruction of no adjustment (end of adjustment) is made As described above, the user changes the current image to a more appropriate image while making various manipulations. When the user has obtained the optimum current image, he gives a instruction indicating the "end of adjustment" in step SP3. In this case, a determination NO is made in step SP3 and the process goes to step SP16, where the color adjustment method (i.e., profile) or the image data as the color adjustment result is held in the image storage section 202. Thus, the process is completed.

More specifically, where the [A] or [B] scheme is adopted as the color conversion scheme, the obtained profile (for converting the RGB signals of the original image into those of the final current image) needs to be converted into a profile suitable for the purpose. On the other hand, when the [C] scheme is adopted, since the objective profile (for converting the L*c*h° signals of the original image into those of the final current image) is already obtained, the image data or the profile and transferred as required.

B. Second embodiment

B-1. Premise of embodiment

Figure 10:
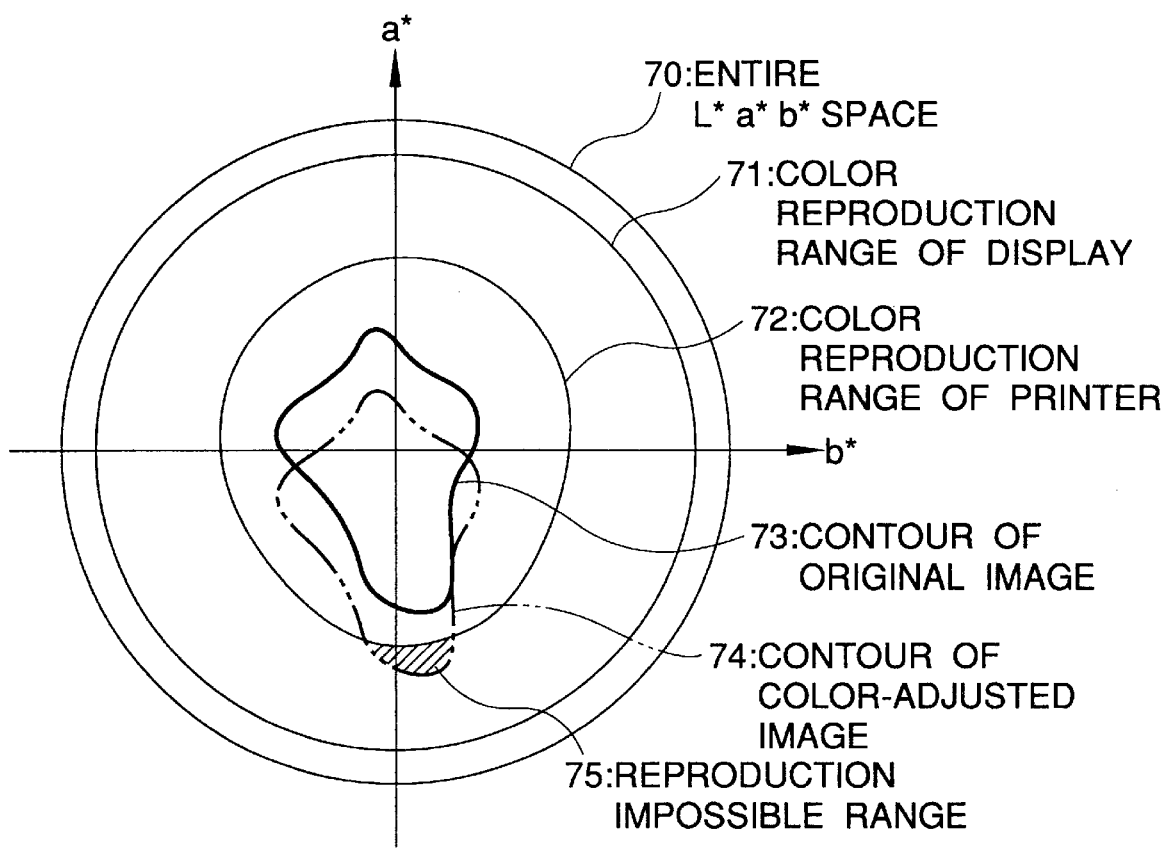
FIG. 10 shows an example of color reproduction ranges of a display and a printer relative to the whole L*a*b* space.

In general, the color reproduction range of color printers etc. is narrower than that of displays etc. In particular, electrophotographic color printers and color copiers are inferior in color reproduction performance in a high chroma range. FIG. 10 shows an example of a color reproduction range 71 of a display and a color reproduction range 72 of a printer relative to a whole L*a*b* space 70.

Even if an original image that is input to an image processing apparatus falls within the printer color reproduction range 72, a portion of the color reproduction range of the image may partially go out of the printer color reproduction range 72 as a result of a color adjustment. If this state is not remedied, gradations disappear in the above portion, causing a problem that a pseudo contour appears in an output image, or like problems. Therefore, in such a case, compression processing is performed on the color-adjusted image so that a contour 74 of the color-adjusted image falls within the printer color reproduction range 72. This is called gamut compression.

If gamut compression is effected, the content of an image is changed. Thus, it is convenient if the user is notified that gamut compression will be performed and a result of the gamut compression is displayed on a display. A second embodiment of the invention is intended for such processing.

B-2. Details of embodiment

Figure 11:
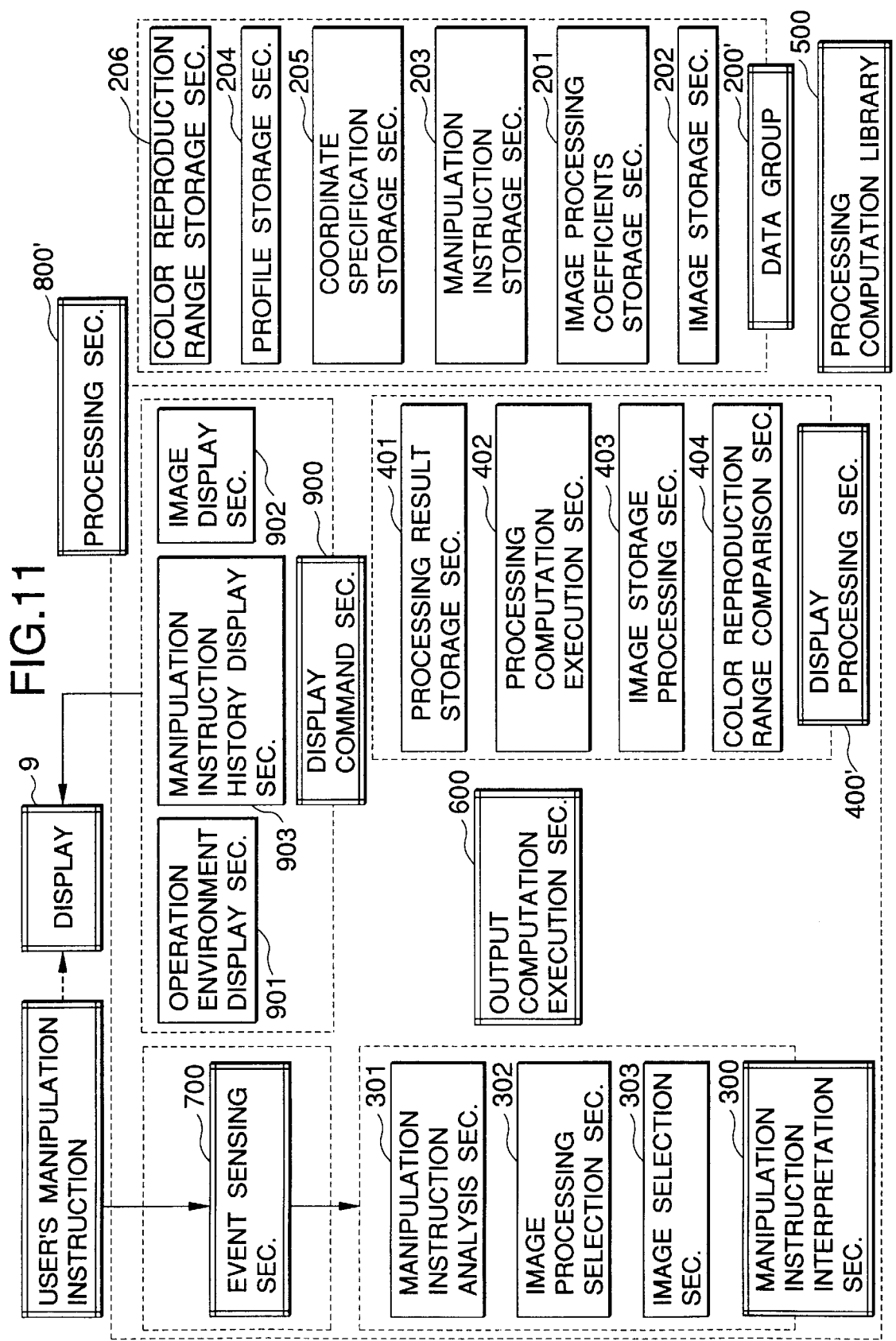
FIG. 11 is a block diagram showing the software configuration of a workstation 100-1 in the second embodiment of the invention.

The hardware configuration of the second embodiment is similar to that of the first embodiment. However, to deal with gamut compression, the software configuration of the second embodiment is as shown in FIG. 11. As shown, a data group 200' is provided with a color reproduction range storage section 206 for storing color reproduction ranges of the respective color image output devices 102-1 to 102-3.

In a display processing section 400, a color reproduction range comparison section 404 is provide which determines a contour (gamut) of the color reproduction range of a color-adjusted image and judges whether the contour has a portion located outside the color reproduction range of an output device. If it is judged that the contour has such a portion, the processing computation execution section 402 performs gamut compression on the image.

Although the specific processing flow of the second embodiment is similar to that of the first embodiment previously described with reference to FIG. 8, but they are different from each other in the following points to perform gamut compression:

(1) In step SP1, the user specifies not only an original image to be processed (as in the case of the first embodiment) but also a output device to be used. Alternatively, the user may specify an output device in step SP3.

(2) In steps SP11 and SP15, color-adjusted images are displayed in the 6 near images display window 50 or the image display subwindow 60 in the same manner as in the first embodiment. In the second embodiment, the color reproduction range comparison section 404 determines a gamut of each of the images to be displayed.

Next, each gamut thus determined is compared with one of the color reproduction ranges in the color reproduction range storage section 206 which corresponds to the previously specified output device. If the gamut is out of the color reproduction range, the image storage processing section 403 executes gamut compression. To distinguish a gamut-compressed image from other images, it is displayed in the 6 near images display window 50 or the image display subwindow 60 so as to be framed in black.

Figure 15:
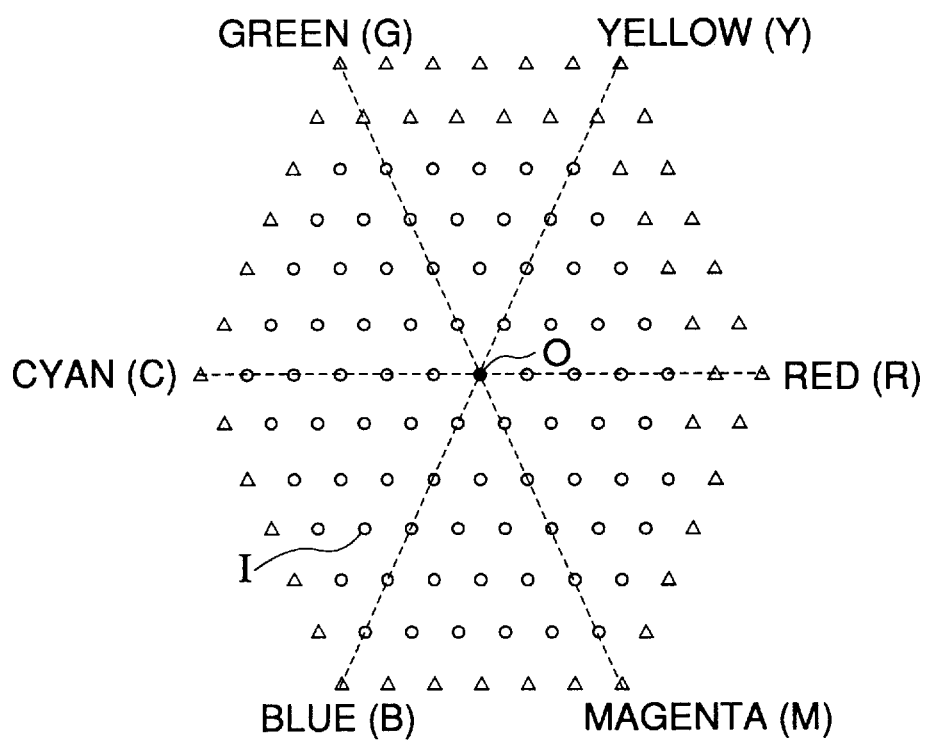
FIG. 15 shows display contents of a state transition display window 30 in the second embodiment of the invention.

(3) Once the color reproduction range of the output device and the gamut of the original image are obtained, it is easy to calculate the degree of color adjustment on the original image which causes the gamut to go out of the color reproduction range. Therefore, in the embodiment, when the state transition display window 30 is rewritten in step SP14, setting points to which gamut compression will be applied are displayed in the state transition display window 30. That is, "○" marks are changed to "Δ" marks, as shown in FIG. 15.

As described above, according to this embodiment, the user can easily recognize the degree of color adjustment which will cause gamut compression by looking at the shapes of the setting points in the state transition display window 30. Similarly, the user can easily recognize it based on gamut-compressed, black-framed images in the 6 near image display window 50 and the image display subwindow 60. Further, since gamut-compressed images themselves are displayed in the windows 50 and 60, the user can easily judge whether an image alteration due to the gamut compression is allowable.

C. Modifications

The invention is not limited to the embodiments described above; for example, the following modifications are possible:

(1) Although a hue circle is displayed in the state transition display window 30 in the above embodiments, various items capable of expressing color differences may be displayed in place of the hue circle. For example, a two-dimensional cross-section in L*a*b* space or RGB space may be displayed.

(2) In the above embodiments, images corresponding to setting points arranged in line are displayed in the image display subwindow 60. However, the apparatus may be so constructed that the number of images to be displayed in the image display subwindow 60 is reduced (for example, to one to three images) and all images are displayed in time series. In this case, the user can click a proper image upon its display, to specify a new current image. In the modification, since the number of images to be displayed simultaneously is reduced, the user can perform a color adjustment in a comfortable manner even where the display 9 is small or the processing ability of the CPU 1 is low.

(3) In the above embodiments, color adjustment processing is performed by using the lookup tables $LUT_n$ shown in FIG. 6(c) when the [A]+[B] scheme is employed as the color conversion scheme, and the table values v shown in FIG. 7C when the [C] scheme is employed. However, the lookup tables LUT$_n$ and the table values v are not limited to those previously described in the embodiments.

Figure 12:
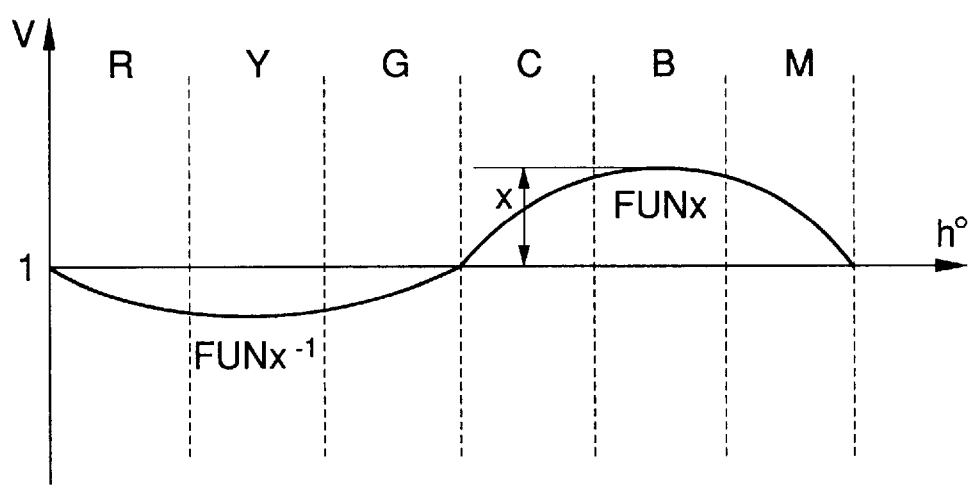
FIG. 12 illustrates how a color adjustment 18 performed in a modification of the first and second embodiments of the invention.
Figure 13:
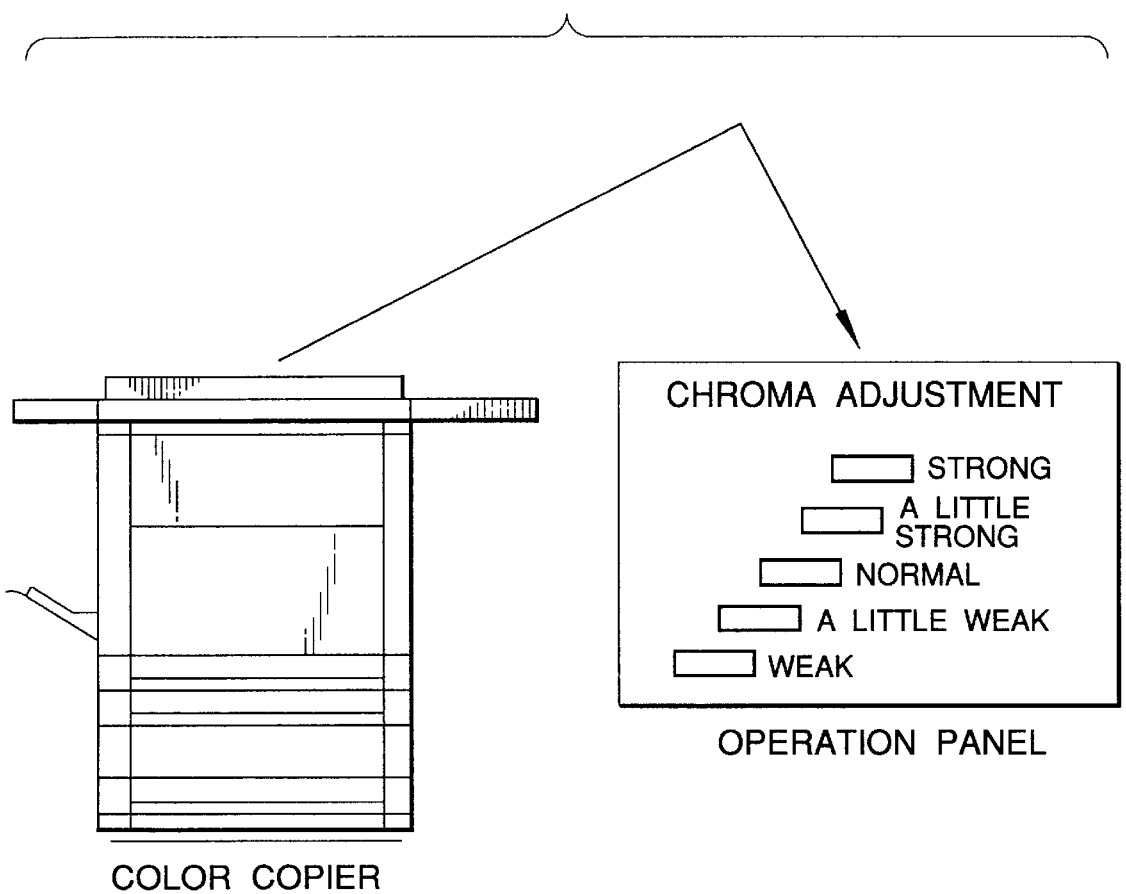
FIG. 13 shows an operation panel of a conventional color copier.
Figure 14:
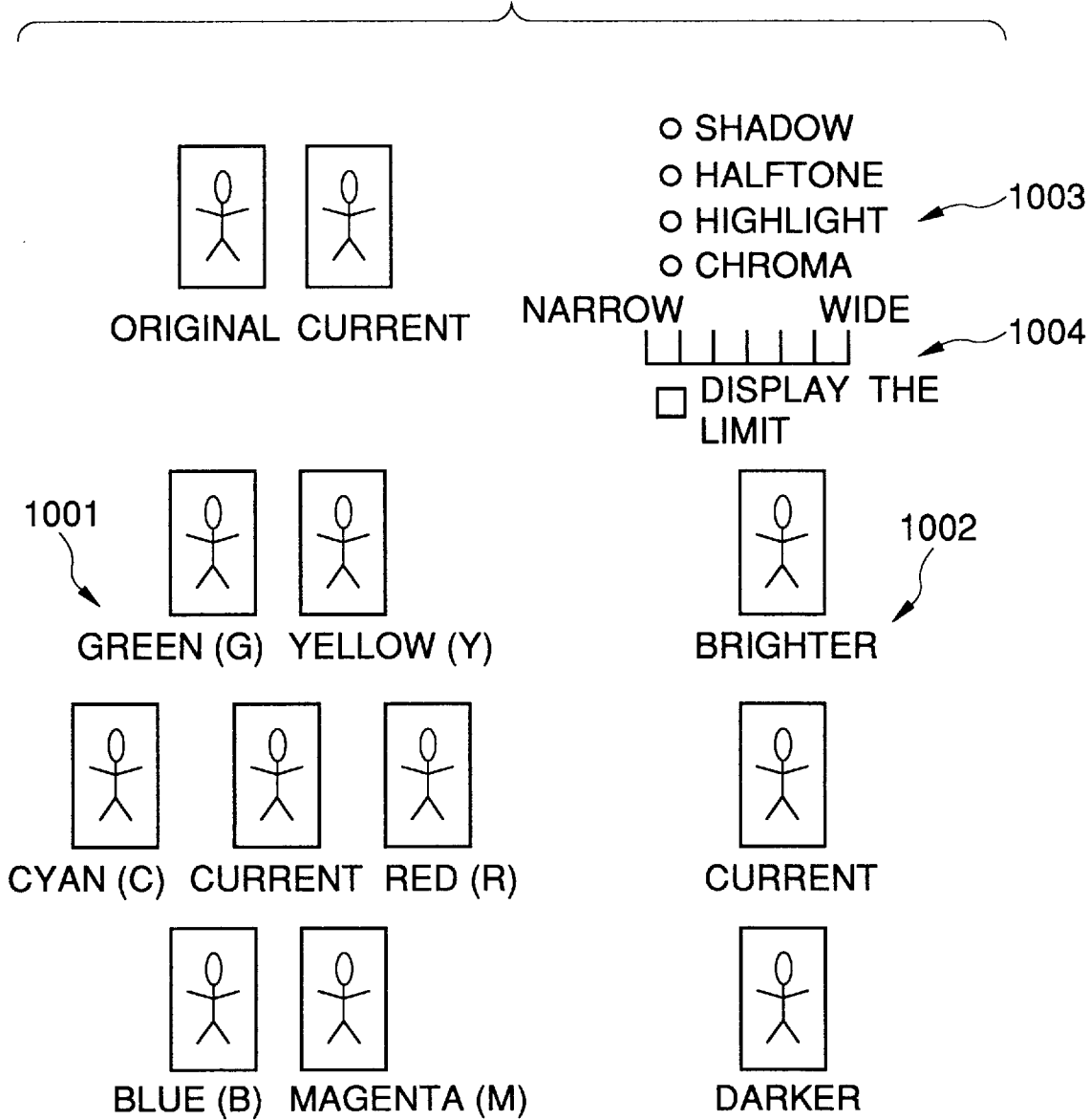
FIG. 14 illustrates a picture on a display of a conventional image processing apparatus.

The tables LUT$_n$ and the values v may be of various types depending on the output device characteristics etc. as long as they strengthen a color to be strengthened and weaken a color to be weakened. For example, table values v shown in FIG. 12 may be used in place of the table values v of FIG. 7C. In FIG. 12, the level of function FUN$_x$ is kept high at the range boundaries, so that the periphery of the color enhancing direction (in the example of FIG. 12, blue (B) direction) is also enhanced.

(4) In the second embodiment, gamut compression is applied to images whose gamut is out of the color reproduction range and the display forms of the state transition display window 30 and the image display subwindow 60 are changed. However, gamut compression need not always be applied to images to be displayed, because in general a comparatively large amount of processing is required for gamut compression although it depends on the compression scheme. The apparatus may be s0 constructed that the user makes an instruction to the effect that compression processing should be performed only when he wants to see gamut compression results.

What is claimed is:

1. An image processing apparatus comprising:

means for displaying levels of image adjustments to be performed on original image data that requires image processing multi-dimensionally on a display;

means for allowing designation of two of the multi-dimensionally displayed image adjustment levels; and means for displaying, on the display, reference images of adjusted image data obtained by performing, on the original image data, image adjustments of a given number of stepped image adjustment levels existing in a direction defined by the two designated image adjustment levels.

2. The image processing apparatus as claimed in claim 1, wherein the reference images are displayed such that a particular reference image is varied in time series.

3. The image processing apparatus as claimed in claim 1, further comprising:

means for storing a color reproduction range of an output device;

means for comparing the color reproduction range of the output device pith a gamut of each of the reference images; and means for changing a display form of a reference image a for which the comparing means has judged that the gamut is out of the color reproduction range.

4. An image processing apparatus comprising:

means for displaying a first reference image of first adjusted image data obtained by performing a first image adjustment on original image data that requires image processing;

means for displaying a second reference image of second adjusted image data obtained by performing a second image a adjustment on the original image data based on an image adjustment level deviated from that of the first image adjustment by a given level difference; and means for displaying reference images of adjusted image data obtained by performing, on the original image data, image adjustments of a given number of stepped image adjustment levels existing in a direction defined by the levels of the first and second image adjustments.

5. An image processing method comprising the steps of:

displaying levels of image adjustments to be performed on original image data that requires image processing multi-dimensionally on a display;

allowing designation of two of the multi-dimensionally displayed image adjustment levels; and displaying, on the display, reference images of adjusted image data obtained by performing, on the original image data, image adjustments of a given number of stepped image adjustment levels existing in a direction defined by the two designated image adjustment levels.

6. An image processing method comprising the steps of:

displaying a first reference image of first adjusted image data obtained by performing a first image adjustment on original image data that requires image processing;

displaying a second reference image of second adjusted image data obtained by performing a second image adjustment on the original image data based on an image adjustment level deviated from that of the first image adjustment by a given level difference; and displaying reference images of adjusted image data obtained by performing, on the original image data, image adjustments of a given number of stepped image adjustment levels existing in a direction defined by the levels of the first and second image adjustments.

* * * * *